United States Patent Office 3,506,828
Patented Apr. 14, 1970

3,506,828
QUATERNARY AMMONIUM BASES AND LIQUID SCINTILLATION COUNTING SOLVENT
David L. Hansen, Palatine, and Elizabeth T. Bush, Chicago, Ill., assignors to Nuclear-Chicago Corporation, Des Plaines, Ill., a corporation of Delaware
No Drawing. Continuation-in-part of application Ser. No. 541,541, Apr. 11, 1966. This application Apr. 1, 1968, Ser. No. 718,003
Claims priority, application Germany, Apr. 8, 1967, N 30,301
Int. Cl. G01t 1/20; G09k 1/02
U.S. Cl. 250—71.5
17 Claims

ABSTRACT OF THE DISCLOSURE

Quaternary ammonium bases, wherein the cationic portion is a N-methyl or N-benzyl di-higher alkyl methyl ammonium grouping, and a solvent composition comprising such a quaternary ammonium base in a solution containing a primary liquid scintillation solvent. The bases can be prepared from the corresponding quaternary ammonium halides such as by treatment with an anion exchange resin or other sources of hydroxide or alkoxide ion.

---

This application is a continuation-in-part of our earlier application Ser. No. 541,541 filed Apr. 11, 1966, now abandoned.

This invention relates to novel higher alkyl methyl ammonium bases of the formula

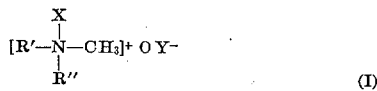

(I)

wherein R' and R" are higher alkyl groups, X is a methyl or benzyl radical and Y is a lower alkyl radical, or preferably hydrogen.

The alkyl radicals encompassed by the terms R' and R" in the foregoing structural formula are typified by butyl, pentyl, hexyl, heptyl, octyl, nonyl, decyl, undecyl, dodecyl, tridecyl, tetradecyl, pentadecyl, hexadecyl, heptadecyl and octadecyl, and the branched-chain groups isomeric therewith. The lower alkyl radicals encompassed by the term Y are typified by methyl, ethyl, propyl, butyl, pentyl, hexyl, heptyl and the branched-chain groups isomeric therewith.

Solutions of the compounds of Formula I can be used as solvents for materials whose radioactivity is to be determined by liquid scintillation counting and can be used as titrants in non-aqueous solutions.

The counting or measurement of radioactivity by the liquid scintillation technique is now in widespread use in biological research and similar endeavor, where radioactive isotopes, such as beta-emitting isotopes such as tritium, carbon-14, phosphorus-32 and sulfur-35 are employed as tracers. The general technique, as is well known, involves direct incorporation of the sample in a liquid scintillation composition, the scintillations being counted constituting a highly efficient indication of the activity of the sample.

In general, the liquid scintillation technique basically involves the use of a suitable fluorescent substance, i.e., a fluor, disposed in a suitable solvent. The solvent, in addition to being required to dissolve the fluor, has further properties which are required in connection with the detection process. The energy of the particle being detected is transferred to the solvent by ionization or other excitation, and it is the induced excitation energy of the solvent which produces the excitation of the fluor. Additionally, the properties of the solvent must be such as to maximize the efficiency with which the light produced by the fluor is transmitted to the light detector or detectors used to convert the scintillation to an electrical pulse. The solvent thus is desirably optically clear and has no substantial color characteristics which produce attenuation of the color characterizing the emission of the fluor. In addition to these fairly obvious optical effects which must be avoided, the excitations of the solvent are subject to being "quenched" in varying degrees by other processes which may occur.

There are now well known a substantial group of liquids meeting the general requirements discussed above, which are generally employed as primary solvents in liquid scintillation solutions. The most efficient of these in common use are the alkylbenzenes, toluene and xylenes (the purified ortho, meta or para forms or mixtures thereof). Benzene and mono-, di- and triethylbenzenes and phenylcyclohexane are comparable in efficiency. Certain alkoxyethers, including anisole and dimethoxybenzene, have only slightly less efficiency. A further primary solvent, p-dioxane, hving an efficiency about 70 percent that of toluene, is frequently employed where miscibility with water is required. Other primary solvents which have been used in liquid scintillation counting are alkylbenzenes such as cumene, p-cymene, n-butylbenzene, mestiylene and 1,2,4-trimethylbenzene; ethers such as diphenylether, dimethoxyethane and ethoxybenzene; various other alkylated aromatic compounds such as monoisopropylbiphenyl and 1-methylnaphthalene; hexane and Decalin. In such solutions, of course, the fluor is the "primary solute," many of which are likewise well known. The choice of primary solvent and primary solute depends upon a variety of factors, both as regards the equipment employed for detection of the light scintillations (wave length sensitivity, etc.) and as regards the specific characteristics of the radiation under measurement and similar factors, particularly the nature of the material to be dissolved or distributed in this "primary" solution for the measurement of its radioactivity.

Where a sample to be counted is readily soluble in various primary solvents, preparation for counting is obviously simplest.

Where the sample cannot be directly dissolved in a primary solvent in adequate concentration, it becomes necessary to employ a secondary solvent, in which the sample may be dissolved, and the resulting solution is thereupon dissolved in the primary solution. Various secondary solvents are used for this purpose, such as alcohols, ethers, etc. In general, however, the use of a secondary solvent somewhat increases the quenching, i.e., reduces the efficiency of the overall process.

One type of sample, which often cannot be directly dissolved in a primary solvent and thus is desirably solubilized with a particular type of secondary solvent, which is very commonly encountered, is animal tissue. These may be digested by use of a strong base. Likewise solubilization difficulties in primary solvents have arisen with aqueous samples containing phosphate, sulfate or carbonate ion. Various strong-base solutions have been used as secondary solvents for such samples. One type of strong base solution for dissolving these types of samples is that of a quaternary ammonium hydroxide in methanol. Previously, the most commonly used hydroxide for this purpose was p-(di-isobutyl)-cresoxyethoxyethyl-dimethylbenzyl ammonium hydroxide, generically termed methylbenzenethonium hydroxide, and commonly referred to in the literature as the hydroxide of "Hyamine 10–X" (trademark of Rohm & Haas). Such a preparation is made from the corresponding halide by a published procedure called the "silver oxide process," see, e.g., Liquid Scintillation Counting, edited by Bell and Hayes, Pergamon Press, 1958, pages 123 et seq.

Solutions of the quaternary ammonium bases of the present invention are useful for the same general purposes as those for which the secondary solvent solutions just mentioned have heretofore been employed. Moreover the compounds of Formula I can be prepared by the ion exchange procedure described herein in primary solvents such as toluene, at concentrations adequate for full dissolving of tissue (and similar) substances, and with substantial reduction of quenching in liquid scintillation counting as compared with compositions heretofore employed, and further, the solutions thus formed have substantially greater dissolving capacity for many types of samples than those previously used.

The use of the hydroxide of "Hyamine 10–X" prepared by the silver oxide process is subject to the objection that the presence of the methanol in the ultimate sample-vial counting solution inherently detracts from the counting efficiency. The undesirability of the methanol has of course long been known, and is mentioned in the paper of Passman, Radin & Cooper, Analytical Chemistry, vol. 28, p. 484 (1956), in connection with the original development of the use of quaternary ammonium compounds for such purposes. Efforts were made to produce a methanol-free solution in toluene (a highly efficient primary solvent) by evaporating the methanol and then dissolving the dried base in toluene, but no satisfactory result could be obtained. Attempts were also made to avoid the methanol by producing a direct solution in toluene with an ion exchange resin, but the concentration obtainable was not sufficiently high. Eisenberg, p. 123 and Radin, p. 108, of Liquid Scintillation Counting (cited previously).

The general principle that quaternary ammonium hydroxides and alkoxides are unstable in the sense that they cannot be prepared as free compounds but only in solution has been found to apply to the compounds of Formula I. Thus these compounds are prepared and used as solutions. Because the quaternary ammonium bases are thus always present in solution the nature of the anionic species present in solution will depend upon the composition of the mixture. Thus, a solution of a quaternary ammonium hydroxide containing methanol may exist as an equilibrium mixture of the quaternary ammonium hydroxide and the quaternary ammonium methoxide. Likewise a solution of the methoxide containing water would be expected to exist as an equilibrium mixture of the methoxide and quaternary ammonium hydroxide.

A solvent composition of the present invention comprises one or more quaternary ammonium bases of Formula I, preferably the hydroxides; wherein each of R' and R" of the predominant quaternary ammonium components contain from 4 to 14 carbon atoms, desirably in a concentration greater than 0.25 M, preferably 0.5 to 1.0 M, in a solution including a primary liquid scintillation solvent. A particularly useful composition is one in which each of R' and R" of the predominant quaternary ammonium hydroxides contain 8 to 12 carbon atoms. Such a composition is employed in the same general manner as secondary solvent solutions heretofore known, to dissolve the sample to be counted, and may thereafter be mixed or diluted with the same or another liquid scintillation solvent, together with the primary fluor solute and any secondary solute of the type normally employed. There is thus produced, for the counting operation, an overall solution generally similar to those heretofore employed for similar purposes, but with substantial reduction of quenching and with higher overall counting efficiency.

The compounds of Formula I can be prepared (a) by anion exchange from the corresponding quaternary ammonium salts, suitably a halide, (b) by the silver oxide method from the corresponding quaternary ammonium halides, (c) by the reaction of alcoholic potassium hydroxide with the corresponding quaternary ammonium chloride, (d) by reaction of the corresponding quaternary ammonium methyl sulfate with sulfuric acid, followed by reaction of the resulting quaternary ammonium hydrogen sulfate with barium hydroxide and (e) by reaction of the corresponding quaternary ammonium halide with a source of alkoxide ion.

The compounds of Formula I for use in liquid scintillation counting are preferably formed by an ion exchange process. Such a procedure affords the required concentration of base in a liquid scintillation solvent and the required clarity of solution without the necessity of the light-aging and other additional processing required in the silver oxide process, without the salt residues, and with lesser amounts of water or alcohol, as are obtained in the silver oxide and other procedures. The desired clarity and stability can readily be obtained by the continuous removal of oxygen at all stages of the ion exchange column process, as now described.

In the ion exchange method, a starting material of the formula

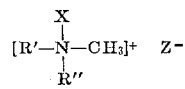

wherein R', R" and X are defined as before and Z is a monovalent anion, or one-half equivalent of a divalent anion, in a suitable solvent, is passed through a basic anion exchange resin. Particularly suitable starting materials in this procedure are compounds wherein Z is a halogen atom, i.e., chlorine, bromine or iodine; particularly useful are the chlorides which may be commercially available. Other quaternary ammonium salts for use as starting materials include the quaternary ammonium hydrogen sulfates, sulfates, nitrates, and hydrogen carbonates. Suitable solvents for use in passing the quaternary ammonium salt through the ion exchange column are water and organic solvents in which the quaternary ammonium starting materials and quaternary ammonium hydroxide products are soluble. Particularly useful solvents for this purpose are those compounds which can function as primary scintillation solvents.

As a specific example, an ion exchange column is employed with an appropriate glass wool or sintered glass resin support, with sealed feed and collecting reservoirs connected to the top and bottom, respectively, by stopcock valves. A strongly basic anion exchange resin in chloride form, such as Dowex 1–X8, preferably of 20 to 50 mesh, is inserted in the column by pouring of a distilled water slurry. The column is then flushed with a sodium hydroxide solution to convert the resin to hydroxide form. Residual sodium hydroxide and sodium chloride are then thoroughly flushed out with distilled water. Reagent grade anhydrous methanol, with all oxygen removed by bubbling of nitrogen for a substantial time, is then fed to the column, the interior of which is at all times maintained with a nitrogen atmosphere above the liquid surface. The nitrogen-bubbled methanol is passed through the column to rinse out the distilled water, a substantial multiple of the resin volume being desirable for this purpose. A reagent grade of the primary liquid scintillation solvent is prepared in suitable quantity (again a substantial multiple of the resin volume) by nitrogen bubbling, and this is flushed through the column to remove the methanol. The quaternary ammonium compound, for example, in chloride form (after suitable purification if normal commercial ammonium compounds are used), is then dissolved in a quantity of the primary solvent, desirably in nearly saturated concentration; again nitrogen bubbling is employed for the removal and exclusion of oxygen. This solution is passed through the resin at a controlled flow rate sufficiently slow to produce substantially complete ion exchange. The basicity of the effluent is monitored, and collection is commenced under a nitrogen atmosphere when a suitably high base concentration is reached, the first portion of the effluent (representing the flushing out of the residual solvent remaining from the previous step) being discarded. Successive batches may of course continue to use the same resin after reconversion to the hydroxide form, occasional reverse flush with distilled water or methanol being desirable to prevent overcompaction, etc., as is well known in such ion exchange procedures.

It will be observed that the procedural steps for converting the quaternary ammonium salt solution to the hydroxide solution are in general more or less conventional in ion exchange column practice. However, it is found extremely important in the present process that oxygen be excluded from the column; and the nitrogen bubbling preparation of successive feed materials, and use of a nitrogen atmosphere above the liquid in the column, are found to be highly critical to producing an effluent solution which is stable and clear, and which produces small quenching when ultimately used to dissolve samples and thereupon mixed with further primary solvent and solute and counted. The use of an ion exchange process in the preparation of liquid scintillation solvents of this type is not in itself novel, the attempts earlier mentioned to avoid the deficiencies of the silver oxide process having included experiments with ion exchange columns which were abandoned. The reason for the criticality of the exclusion of oxygen is not fully known. It is known that dissolved oxygen appearing in the ultimate solution could have a quenching effect, but the difference in results produced is much too great to be accounted for by such a simple explanation, particularly in view of the fact that exposure of the final solution to oxygen has no comparable effect to that produced by permitting oxygen to enter the column.

There is evidence that the methanol employed in the flushing step described may either produce a reaction with the ion exchange resin in the hydroxide form or may not be completely washed out of the column, or both, resulting in the fact that the effluent of the ion exchange procedure contains varying amounts of [$OCH_3$] which may exist in the solution either as methanol or methoxide. Accordingly, reference to the final solute as the "hydroxide" should not be construed to be limited to the pure hydroxide, but include other anions associated with the particular cation which may inherently be produced.

The process just described produces clear solutions of the quaternary ammonium base directly in the primary scintillation solvent in high concentration and the ultimate results obtainable in use are greatly superior to those heretofore known for comparable purposes. Further, the present solutions may be stored for many months without impairment. Where desired, the concentration may of course be increased by evaporation.

The potassium hydroxide method for preparing the quaternary ammonium compounds of Formula I involves the reaction of the corresponding quaternary ammonium chloride in an alkanol, suitably methanol, with potassium hydroxide to afford the corresponding quaternary ammonium hydroxide in the alkanol solution after filtration of the precipitated potassium chloride. Similarly reaction of the corresponding quaternary ammonium chloride with an alkali metal alcoholate in an alkanol affords the corresponding quaternary ammonium alkoxide in the alkanol solution, after precipitation of the sodium chloride. These procedures are limited in that the alcohol present as solvent and the alkali metal chloride residues remaining in the alcohol solution limit the desirability of the product as a secondary solvent in the scintillation counting.

The silver oxide method for the preparation of the quaternary ammonium hydroxides of Formula I involves the reaction of the corresponding quaternary ammonium halide wherein the halogen is bromine, iodine or preferably chlorine, with silver oxide in water or water-alcohol solution to afford the corresponding quaternary ammonium hydroxide in such solution, which is purified by filtration of the silver halide precipitate and excess silver oxide. The excess silver compounds can be removed after light aging. The usefulness of these procedures for preparing quaternary ammonium hydroxides for liquid scintillation counting is limited since the presence of water or an alkanol in the final solution tends to reduce the counting efficiency.

The barium hydroxide method for the preparation of the quaternary ammonium compounds of this invention involves heating the methyl sulfate analogs of the compounds of Formula I with sulfuric acid to afford the corresponding hydrogen sulfate, which is treated with barium hydroxide to afford a solution of the quaternary ammonium hydroxide, after removal of the precipitated barium salts. The use of the quaternary ammonium hydroxides thus obtained is limited by the presence of barium salts in solution and the use of an alcohol or water as solvent.

The following examples further illustrate the invention.

EXAMPLE 1

An ion exchange column whose bed height is approximately twenty times the diameter is filled with a polystyrene trimethylbenzyl ammonium chloride anion exchange resin (Dowex 1–X8, 20 to 50 U.S. Mesh). The resin is changed to the hydroxide form by passing through the column ten bed volumes of 1 N sodium hydroxide at a flow rate of about 1 ml./min./cm.$^2$ cross section of the bed, followed by the successive addition of four bed volumes each of distilled water, methanol and primary solvent at 2 ml./min./cm.$^2$. Beginning with the methanol flushing and continuing through all subsequent steps, the solvents are preflushed with a nitrogen atmosphere and the column is maintained under a nitrogen atmosphere. Following the methanol addition the column is back washed with methanol to remove trapped gas bubbles. A nearly saturated solution of the quaternary ammonium halide is prepared in a primary solvent and is saturated with nitrogen. This solution is then passed through the column under a nitrogen atmosphere at a flow rate of about 0.5 ml./min./cm.$^2$, and collected under nitrogen gas. The methanol content of the resulting solution may be reduced and the normality of the quaternary ammonium base may be increased by bubbling nitrogen through the solution. It is preferable that the amount of quaternary ammonium halide starting material used should not exceed one half the expected capacity of the ion exchange resin.

The use of (a) a saturated toluene solution of a mixture of hydrogenated ditallowdimethyl ammonium chloride (the hydrogenation product of ditallowdimethyl ammonium chloride, a mixture in which the term "tallow" designates the following substituents in the indicated, approximate percentages by weight: tetradecyl, 3%; hexadecyl, 25%; hexadecenyl, 3%; octadecyl, 25%; octadecenyl, 44%; and minor components), 2-propanol and water in a weight ratio of 75/15/10; or (b) a solution, containing on a weight basis, 50% dilauryldimethyl ammonium chloride (a mixture containing 96% dodecyl and 4% decyl by weight as the lauryl component) (44% toluene, 10% 2-propanol and 6% water), affords the corresponding quaternary ammonium bases, respectively, in a Normality of 0.25 and 0.68 respectively.

The use of toluene solutions containing 22 and 54 percent by weight of dilauryldimethyl ammonium chloride in the above procedure affords the corresponding quaternary ammonium bases in Normalities of 0.37 and 0.88, respectively.

The use of dioctylbenzylmethyl ammonium chloride in toluene in the above procedure affords the corresponding quaternary ammonium hydroxide base solution in a Normality of 0.41.

The use of a saturated solution of dilauryldimethyl ammonium chloride (defined as above) in dioxane in the above procedure affords the corresponding quaternary ammonium hydroxide base solution in a Normality of 0.25.

The use of didecylbenzylmethyl ammonium chloride in toluene in the above procedure affords the corresponding quaternary ammonium base in a Normality of 0.47.

The use of dicocodimethyl ammonium chloride in the above procedure (the composition of such compound being defined by Bailey "Industrial Oil and Fat Products," Interscience Publishers, Inc., New York, N.Y., 1945, p. 140, as 0.8% hexyl, 5.4% octyl, 8.4% decyl, 45.4% dodecyl, 18.0% tetradecyl, 10.5% hexadecyl, 2.3% octadecyl, 0.4% 5,8,11,14-eicosatetraenyl, 7.5% 9-octadecenyl and 0.5% other saturated radicals) in toluene, a mixture of o-, m- and p-xylenes, dioxane, n-hexane and cyclohexane, affords respectively the corresponding quaternary ammonium base solution in the Normality 0.73, 0.57, 0.17, 0.47 and 0.24 respectively. Improved properties of the resulting products can be obtained by mixing the crude, oily dicocodimethyl ammonium chloride with sodium borohydride at room temperature for about 16 hours, prior to use of that chloride in the above procedure.

The use of didecyl dimethyl ammonium chloride and dioctyldimethyl ammonium chloride in toluene in the above procedure affords, respectively the corresponding quaternary ammonium hydroxides in toluene solution.

EXAMPLE 2

A saturated solution (6.37 Normal) of technical grade sodium methoxide in methanol is prepared. A separate toluene solution (0.895 Normal) of dicocodimethyl ammonium chloride (defined as in Example 1) which has been crystallized three times from ethyl acetate is prepared. 0.478 mole each of the sodium methoxide and the dicocodimethyl ammonium chloride in the above solutions are taken and mixed. The resulting solution of dicocodimethyl ammonium methoxide is decanted from the sodium chloride precipitate and the solution is then diluted with toluene so as to be 0.6 Normal in quaternary ammonium compound, and then placed in a freezer at —20° C. The liquid is then filtered in vacuo through a low retention polyethylene fiber filter on a cold Buchner funnel to remove precipitated sodium chloride, and the solution found to be 0.79 Normal.

Substitution of molecular equivalent quantities of 2-propanol and sodium 2-propoxide for the methanol and sodium methoxide in the above procedure affords the corresponding dicocodimethyl ammonium propoxide.

EXAMPLE 3

Substitution of a molecular equivalent amount of dicocodimethyl ammonium chloride for the "Hyamine 10–X" in the silver oxide procedure described by Eisenberg, in "Liquid Scintillation Counting," Bell and Hayes eds., Pergamon, N.Y. 1958, page 123, affords the dicocodimethyl ammonium hydroxide in a Normality of 1.0.

Tests on a composition comprising didodecyldimethyl ammonium hydroxide (prepared as in Example 1) in a primary liquid scintillation solvent show highly advantageous results as compared with the "Hyamine 10–X" hydroxide methanol solution, both as regards quenching properties and as regards the amount of biological tissue of various forms which can be incorporated in any given volume of the overall ultimate counting composition, in addition to ease and rapidity of dissolving tissue at ordinary temperatures.

Comparative data were taken on the preparation and counting of samples of albumen (a protein presenting a difficult counting problem) and chicken muscle with the composition just mentioned and with the methanol solution of the hydroxide of "Hyamine 10–X". The solution of the present invention was prepared in a concentration of 0.8 M by the ion exchange process described above from didodecyldimethyl ammonium chloride (Aliquat 204, General Mills), and diluted with an equal quantity of toluene. A "Tyamine 10–X" hydroxide solution of 1.0 M in methanol was prepared by the silver oxide process and also diluted with an equal quantity of toluene. With an albumen sample as a 23% solution in water, it was found that the aforementioned dialkyldimethyl base solution dissolved 67 mg. of albumen per milliequivalent of the base, while the Hyamine base solution dissolved only 24 mg. of albumen per milliequivalent of the base with the same digestion procedure, ultrasonic agitation for 3½ hours at 35° C. Similarly, it was found that the present quaternary base dissolved 45 mg. of the chicken muscle (ground, dried and moistened with water) per milliequivalent of the base, while the "Hyamine 10–X" hydroxide dissolved only 21 mg. per milliequivalent. Additionally, it was observed that substantial water content of samples introduces no problem of phase separation, such as is frequently encountered in alcoholic solutions of "Hyamine 10–X" hydroxide, so that the improved ease of digestion, which is obtained with dried or powdered samples by addition of a small amount of water, can be obtained with the present compositions, without the problems introduced in later counting encountered with alcohol solutions. Experiments with digestion without agitation demonstrated that some types of samples requiring heating for dissolving in "Hyamine 10–X" hydroxide solutions were fully dissolved overnight in the present solutions at room temperature.

When the tissue samples dissolved by the agitation procedure described above were incorporated in the primary counting solution (additional toluene plus the fluor) in 20 ml. counting vials, in an amount bearing 125 mg. of the albumen, the efficiency for counting tritium in the counting sample was 14.3% with the new dialkyldimethyl solubilizer and only 5.5% with the old "Hyamine 10–X" hydroxide. A similar experiment with the muscle (125 mg. and 0.5 ml. of water in each counted sample) produced a tritium counting efficiency of 12.8% with the new composition and only 4.6% with the old.

Similar improvements in both solubility and counting efficiency were observed in using the tissue-dissolving solvent solution of this invention with a variety of samples of plasma, serum, purified protein, amino acids, and similar substances.

The didodecyldimethyl ammonium base was also produced in the manner described in Example 1, except that no methanol was used in flushing the column, in a p-dioxane solution. The dissolving of tissue was again a substantial improvement over the corresponding result obtainable with the "Hyamine 10–X" hydroxide solution and tritium counting efficiencies greater than twice those of corresponding "Hyamine 10–X" hydroxide samples were obtained when these digests were then dissolved in toluene scintillator solution. Generally similar improvement is obtained when the present class of quaternary ammonium bases is used in other primary scintillation solvents.

The present compositions may be advantageously employed in the same manner as alcohol solutions were previously employed even where the primary scintillation solvent used in the dissolving solution is not the same as the predominant solvent in the ultimate scintillating composition. For example, a tissue sample may be dissolved in a 1.0 M solution of one of the present dialkyl ammonium bases in toluene, and this composition may then be added to another primary liquid scintillation solvent in which the base would be much less soluble, along with a fluor to form the ultimate scintillation solvent; in such a case, the toluene serves in part the same purpose for which methanol was heretofore employed, i.e., a solvent used as an intermediate for dissolving the base to permit dissolving of the tissue sample in the ultimate overall scintillating composition.

Although the compositions of the invention described above are particularly advantageous because of the substitution of a primary scintillation solvent for methanol, it is found that considerable methanol may be tolerated in the composition, such as residual methanol from early stages of the ion exchange process, without large adverse effects, even with as much as 25 percent methanol. Indeed it is found that the advantages of the invention may be obtained to considerable degree even with methanol solutions of the dialkyl quaternary ammonium bases, prepared by the silver oxide process. In one experiment three solutions were employed, one of 1.0 N "Hyamine 10–X" hydroxide in methanol, the 1.0 N dicoco quaternary ammonium hydroxide in mechanol prepared as in Example 3 by the silver oxide process, and one of the same hydroxide, 0.6 N in toluene, made by the ion exchange process already described. These solutions were then compared in performance as regards dissolving of tissue, phase separation of sample, water content, and quenching effects in counting.

Two ml. each of the three solutions were compared as to ease of dissolving standard test samples of 50 mg. of ground dried chicken tissue with 0.2 ml. of water. The two methanol solutions each required about 10 hours of digestion at 50 degrees C. The toluene solution, however, required only about 30 minutes at the same temperature. These and similar data tend to indicate that the solubilizing superiority of the compositions having the primary liquid scintillation solvent stems primarily from elimination of an inhibition of the dissolving power of the solvent composition produced by alcohol. As regards this property, accordingly, the most important advantage of the dicocodimethyl compositions is their direct solubility at high concentrations in primary liquid scintillation solvents.

When the samples as just described werec ombined with 10 ml. of toluene having 6 g./l. of the fluor PPO i.e., 2,5-diphenyloxazole, dissolved therein, the "Hyamine 10–X" hydroxide composition displayed phase separation, while even the methanol solution of the dialkyl base did not.

For comparison of quenching effects of the cations, 2 ml. blanks of the "Hyamine 10–X" hydroxide solution and the dicocodimethyl base solution in alcohol prepared by the same process were each dissolved in the toluene-PPO scintillator solution, and standard beta source (tritium-labeled toluene) was added and the overall samples were then counted. The tritium efficiency of the sample containing the "Hyamine 10–X" hydroxide solution in methanol was 8.0 percent, and the dicocodimethyl solution in methanol 14.5 percent. Thus the mere substitution of the described dialkyl quaternary ammonium compounds for "Hyamine 10–X" hydroxide compounds in the overall method otherwise well-known itself produces large improvement in counting efficiency.

What is claimed is:

1. A solvent composition for dissolving samples for liquid scintillation counting consisting essentially of (a) a solvent suitable for use in liquid scintillation counting and (b) at least one quaternary ammonium base selected from the group of the formula

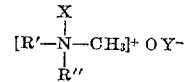

wherein R' and R" are alkyl radicals of from 4 to 18 carbon atoms, X is selected from the group consisting of methyl and benzyl radicals, and Y is selected from the group consisting of hydrogen, and lower alkyl radicals, the predominant class of quaternary ammonium consisting of the group wherein R' and R" contain from 4 to 14 carbon atoms.

2. According to claim 1, a solvent composition in which the quaternary ammonium bases are present in at least 0.25 molar concentration.

3. The solvent composition of claim 2, wherein the liquid scintillation solvent is predominately a lower alkylbenzene.

4. The solvent composition of claim 2 wherein the solvent of the composition is predominately a liquid selected from the group consisting of benzene, toluene, xylene and p-dioxane, and mixtures thereof, and OY is selected from the group consisting of hydroxide and methoxide.

5. The solvent composition of claim 3, in which the cation of the quaternary ammonium base is essentially didodecyldimethyl ammonium.

6. The solvent composition of claim 3, in which the quaternary ammonium base is essentially a mixture of didodecyldimethyl ammonium hydroxide and methoxide.

7. The solvent composition of claim 6, in which the solvent of the composition is predominately toluene.

8. The solvent composition of claim 3, in which the cations of the predominant class of quaternary ammonium bases present consist of dioctyldimethyl ammonium, didecyldimethyl ammonium, didodecyldimethyl ammonium and mixtures thereof.

9. The solvent composition of claim 8, in which the anions of the quaternary ammonium base are selected from the group consisting of hydroxide and methoxide.

10. The solvent composition of claim 3, in which the cation of the quaternary ammonium base is dicocodimethyl ammonium.

11. The solvent composition of claim 10, in which the anions of the predominant quaternary ammonium base are selected from the group consisting of hydroxide and methoxide.

12. The solvent composition of claim 11, in which the solvent of the composition is predominately toluene.

13. In a method of measuring radioactivity wherein a radioactive sample is dissolved in a solubilizing solution of at least one quaternary ammonium base, and wherein the resultant solubilized sample is dissolved in a primary liquid scintillation solvent if the solubilizing solvent does not contain any or sufficient primary solvent for counting, and wherein a fluor solute is added and the scintillations occuring are counted, wherein the improvement consists of using as the quaternary ammonium base at least one base selected from the group of the formula

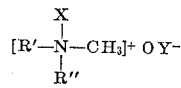

wherein R' and R" are alkyl radicals of from 4 to 18 carbon atoms, X is selected from the group consisting of methyl and benzyl radicals, and Y is selected from the group consisting of hydrogen, and lower alkyl radicals, the predominant class of quaternary ammonium consisting of the group wherein R' and R" contain from 4 to 14 carbon atoms.

14. In the method of claim 13, the improvement wherein the cation of the base is essentially didodecyldimethyl ammonium.

15. In the method of claim 13, the improvement wherein the predominant class of quaternary ammonium bases are those having cations selected from the group consisting of dioctyldimethyl ammonium, didecyldimethyl ammonium, didodecyldimethyl ammonium.

16. In the method of claim 13, the improvement wherein the cation of the base is essentially dicocodimethyl ammonium.

17. The method of claim 13 wherein the solubilizing solution consists essentially of at least one quarternary ammonium base in a primary liquid scintillation solvent wherein the total concentration of the quaternary ammonium bases is at least 0.25 molar.

References Cited

UNITED STATES PATENTS 3,068,178  12/1962  Kallmann et al. ____ 252—301.2

OTHER REFERENCES

John M. Passmann, et al., Analytical Chemistry, vol. 28, pp. 484–86 (April 1956).

LEON D. ROSDOL, Primary Examiner

D. L. ALBRECHT, Assistant Examiner

U.S. Cl. X.R.

252—363.5, 364, 408; 260—567.6

Disclaimer 3,506,828.—*David L. Hansen*, Palatine, and *Elizabeth T. Bush*, Chicago, Ill. QUATERNARY AMMONIUM BASES AND LIQUID SCINTILLATION COUNTING SOLVENT. Patent dated Apr. 14, 1970. Disclaimer filed Dec. 23, 1974, by the assignee, *G. D. Searle & Co.*

Hereby enters this disclaimer to claims 1 through 12 of said patent.

[*Official Gazette July 20, 1976.*]